United States Patent
Muramatsu

(10) Patent No.: US 7,562,820 B2
(45) Date of Patent: Jul. 21, 2009

(54) BARCODE RECOGNITION APPARATUS

(75) Inventor: Takeharu Muramatsu, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 582 days.

(21) Appl. No.: 10/539,236

(22) PCT Filed: Dec. 17, 2002

(86) PCT No.: PCT/JP02/13194

§ 371 (c)(1),
(2), (4) Date: Jun. 16, 2005

(87) PCT Pub. No.: WO2004/055713

PCT Pub. Date: Jul. 1, 2004

(65) Prior Publication Data

US 2006/0113390 A1    Jun. 1, 2006

(51) Int. Cl.
*G06F 19/00* (2006.01)
(52) U.S. Cl. ............. 235/400; 235/462.16; 235/472.02; 358/521; 382/289
(58) Field of Classification Search ................. 235/400, 235/462.16, 472.02; 358/521; 382/289
See application file for complete search history.

(56) References Cited

U.S. PATENT DOCUMENTS

| 4,323,772 | A |   | 4/1982  | Serge           |         |
|-----------|---|---|---------|-----------------|---------|
| 5,153,418 | A |   | 10/1992 | Batterman et al.|         |
| 5,565,669 | A |   | 10/1996 | Liu             |         |
| 5,703,972 | A | * | 12/1997 | Lopresti et al. | 382/310 |
| 6,674,919 | B1| * | 1/2004  | Ma et al.       | 382/289 |

FOREIGN PATENT DOCUMENTS

| CN | 1279441 A   | 1/2001  |
|----|-------------|---------|
| CN | 2471019 Y   | 1/2002  |
| EP | 0 880 103 A2| 11/1998 |
| JP | 57-8874 A   | 1/1982  |
| JP | 63-115282 A | 5/1988  |
| JP | 5-19694 A   | 1/1993  |
| JP | 6-325197 A  | 11/1994 |

(Continued)

OTHER PUBLICATIONS

Quan Wei et al., Information and Control, pp. 25-29, vol. 31, No. 1 (Feb. 2002).

*Primary Examiner*—Allyson N Trail
(74) *Attorney, Agent, or Firm*—Birch, Stewart, Kolasch & Birch, LLP

(57) ABSTRACT

After binarization is performed, the adjacency relationship of connection fields is analyzed from a labeled input image on the basis of the characteristics of the structure of a barcode, thereby extracting a barcode field. A unit width, which is to be used as the module width of the barcode, is determined in accordance with the widths of the connection fields of black pixels in the extracted barcode field. Based on the arrangement of the magnification of the unit width, the barcode is recognized by collating a prescribed barcode pattern with the input width pattern. In the aforementioned collation, the influence of noises, for example, can be reduced by setting an allowable range for the collation of the widths in each magnification, and the barcode can be recognized in an improved precision even in a low-resolution image photographed using a small image sensor built in a mobile terminal.

11 Claims, 14 Drawing Sheets

FOREIGN PATENT DOCUMENTS

| | | |
|---|---|---|
| JP | 7-262297 A | 10/1995 |
| JP | 8-161423 A | 6/1996 |
| JP | 9-16701 A | 1/1997 |
| JP | 9-22437 A | 1/1997 |
| JP | 10-15150 A | 1/1998 |
| JP | 10-15152 A | 1/1998 |
| JP | 10-105641 A | 4/1998 |
| JP | 2000-285197 A | 10/2000 |
| JP | 2001-14421 A | 1/2001 |
| JP | 2001-119683 A | 4/2001 |
| JP | 2001-197186 A | 7/2001 |
| JP | 2002-196509 A | 6/2002 |
| JP | 2002-290607 A | 10/2002 |
| KR | 2001-0044743 A | 6/2001 |

* cited by examiner

FIG. 7

| MAGNIFICATION | ALLOWABLE ERROR RATIO |
|---|---|
| 1 | 50% |
| 2 | 70% |
| 3 | 90% |
| 4 | 110% |

FIG. 8

| WIDTH 1 | WIDTH 2 | WIDTH 3 |
|---|---|---|
| 1 | 1 | 1 |

FIG. 9

| WIDTH 1 | BAR |
|---|---|
| WIDTH 2 | SPACE |
| WIDTH 3 | BAR |

FIG. 10

| NUMERICAL VALUE | WIDTH 1 | WIDTH 2 | WIDTH 3 | WIDTH 4 |
|---|---|---|---|---|
| 0 | 3 | 2 | 1 | 1 |
| 1 | 2 | 2 | 2 | 1 |
| 2 | 2 | 1 | 2 | 2 |
| 3 | 1 | 4 | 1 | 1 |
| 4 | 1 | 1 | 3 | 2 |
| 5 | 1 | 2 | 3 | 1 |
| 6 | 1 | 1 | 1 | 4 |
| 7 | 1 | 3 | 1 | 2 |
| 8 | 1 | 2 | 1 | 3 |
| 9 | 3 | 1 | 1 | 2 |

FIG. 11

|  | ON THE LEFT | ON THE RIGHT |
|---|---|---|
| WIDTH 1 | SPACE | BAR |
| WIDTH 2 | BAR | SPACE |
| WIDTH 3 | SPACE | BAR |
| WIDTH 4 | BAR | SPACE |

FIG. 13

| NUMERICAL VALUE | COMBINATION | NUMERICAL VALUE | COMBINATION |
|---|---|---|---|
| 0 | 111111(63) | 5 | 100110(38) |
| 1 | 110100(52) | 6 | 100011(35) |
| 2 | 110010(50) | 7 | 101010(42) |
| 3 | 110001(49) | 8 | 100101(41) |
| 4 | 101100(44) | 9 | 100101 (37) |

ODD PARITY IS "1" AND EVEN PARITY IS "0". IN PARENTHESES, NUMBER SYSTEM IS DECIMAL

FIG. 14

| WIDTH 1 | WIDTH 2 | WIDTH 3 | WIDTH 4 | WIDTH 5 |
|---|---|---|---|---|
| 1 | 1 | 1 | 1 | 1 |

FIG. 15

| WIDTH 1 | SPACE |
|---|---|
| WIDTH 2 | BAR |
| WIDTH 3 | SPACE |
| WIDTH 4 | BAR |
| WIDTH 3 | SPACE |

|H−H'| ≤ 0.8H

NOT ADJACENT BAR
(DIFFERENCE OF HEIGHTS
IS MORE THAN 20%)

NOT ADJACENT BAR
(DIFFERENCE IN X DIRECTION IS
MORE THAN SIX TIMES OF WIDTH)

BARCODE RECOGNITION APPARATUS

TECHNICAL FIELD

The present invention relates to a barcode recognition apparatus for recognizing barcodes extracting barcode fields from inputted image data, a barcode recognition method, a program, and the like thereof.

BACKGROUND ART

In recent years, as image sensors with small size and low power consumption have been developed, it becomes possible to have cameras built in mobile devices, such as mobile phones, and to instantly transmit an image photographed using the built-in camera via electronic mail. Such built-in cameras are given priority for small size, so that the resolution thereof is lower than that of general digital cameras.

Also, mobile phones in recent years have a function for connecting to the Internet. It is necessary to input URL using keys in order to connect to the Internet, and it takes effort to type a long URL using the keys of a mobile phone. Thus, attempts have been made by which URL is managed using a unique number and a printed barcode that corresponds to the number is read via a barcode reader, thereby eliminating an effort to input URL and improving usability for users. In such apparatuses, the barcode reader is required to be connected separately to the mobile phone.

Thus, mobile phones with built-in cameras are capable of using such services without separately preparing the barcode reader if a barcode can be recognized with respect to a barcode image inputted via the built-in camera.

However, the resolution of built-in cameras at present is lower than that of image sensors used for barcode readers, so that it is difficult to recognize a barcode in high precision.

Also, causes of the difficulty in recognizing a barcode include the fact that the widths of bars photographed in an input image are not constant. This is because the distance relationship between the barcode and the camera varies in each input. In scanners for close-up scans, it is always possible to input a barcode in a constant size, so that the widths of the bars can be predetermined. However, in a case where the barcode is photographed using a camera held in the hands, it is impossible to predetermine a fixed width for the bars.

A method for recognizing a barcode has been proposed by which the widths of bars are determined on the basis of a barcode image inputted via an image scanner. For example, in JP Patent Publication (Kokai) No. 6-325197 A (1994), the width of a bar is determined by counting the degree of the width of pixels in each scanning line. The following describes the principle for determining the width.

FIG. 19 shows the relationship between detection frequency and the width. As shown in FIG. 19, the detection frequency of widths with respect to a scanner line is extracted. Thus, a field of frequency with not less than a certain threshold value is detected as a valid width. In the example of FIG. 19, sections 1, 2, and 3 are valid widths. Further, two long sections among the valid widths are selected to be handled as the widths of bars. In this method, two types of widths, namely "thin" and "thick" widths, can be detected from the top two widths of high frequency. However, a low-resolution image has a problem that the intervals of frequency peaks become short and detection is unstable. Also, the method cannot be used for a barcode having a plurality of widths.

In a case where a barcode is photographed using a camera, a field of characters or design other than the barcode on the periphery of the barcode are included in an input image. Thus, it is necessary to extract a barcode field from the input image. In JP Patent Publication (Kokai) No. 9-16701 A (1997) (FIG. 19), the barcode field is extracted on condition that the intervals of bars are within a certain threshold value. This is effective for a system, such as a scanner, by which an input image can be obtained in a relatively stable manner. However, the widths of the bars have a wide variation due to the distance between the subject and the camera, since the barcode is inputted while the camera is held in the hands. This poses problems in that, in some cases, the barcode field cannot be extracted successfully with a fixed threshold value.

In order to resolve such problems, in JP Patent Publication (Kokai) No. 9-22437 A (1997), when a barcode field is extracted, patterns characteristic of barcodes are examined so as to try to improve extraction accuracy.

FIG. 18 shows an illustration of the constitution of a barcode. As shown in the figure, barcode 1 has left guard bars 2 (or start bars) characteristic of barcodes, center bars 3, and right guard bars 4 (or end bars). In this case, the left guard bars 2 are disposed at the start point (on the left) of the barcode 1. The left guard bars 2 has a pattern where a black bar and a white bar are alternately arranged and information of "101" (module representation) is set as start information of the barcode 1. The center bars 3 are disposed in the central position of the barcode 1. The center bars 3 has a pattern where a black bar and a white bar are alternately arranged and information of "01010" (module representation) is set as center information of the barcode 1. The right guard bars 4 are disposed at the end point of the barcode 1. The right guard bars 4 has a pattern where a black bar and a white bar are alternately arranged and information of "101" (module representation) is set as end information of the barcode 1.

Six-digit data characters 5 on the left are disposed between the left guard bars 2 and the center bars 3, and six-digit data characters 6 on the right and a check digit 7 are disposed between the center bars 3 and the right guard bars 4. A numerical value in the left end below the barcode 1 represents a prefix digit 8.

FIG. 20 shows a flow chart indicating the flow of a conventional barcode extraction process. First, a particular field where the intervals of bars are within a certain threshold value as mentioned above is extracted as a complex field (step 401). The complex field can be referred to as a field where a barcode is assumed to exist.

Next, the presence of the aforementioned center bars, the right guard bars, and the left guard bars is determined from the extracted complex field, and then whether the extracted complex field is a barcode is determined (steps 402 to 404). Then, each character of the barcode is recognized with respect to the field determined to be the barcode (step 405).

In this case, when determining the presence of the center bars, the right guard bars, and the left guard bars, the patterns of the module representation of the bar constitution are collated on the basis of the width of the extracted bars and a predetermined module width of bars. The module width is predetermined in accordance with the resolution of a scanner.

For example, in a case where a document is read with a scanner having a resolution of 200 dpi, one module is represented in four pixels, so that the module width is decided to be four pixels.

However, as mentioned above, the widths of the bars have a wide variation due to the distance between the subject and the camera, since the barcode is inputted while the camera is held in the hands. Thus, this poses problems in that the module width cannot be specified in advance.

Also, an image inputted using a low-resolution camera has a bar width of about two pixels. In a barcode such that four types of widths are used, no bars have completely the same width as the module width due to noises upon input, for example. Thus, by merely comparing the widths in a strict manner, thick bars can be erroneously recognized as thin. This poses problems in that collation cannot be made accurately.

In order to resolve such problems, in JP Patent Publication (Kokai) No. 4-263381 A (1992), when comparing the widths of bars in prescribed patterns with the widths of bars that are inputted, the bar widths are determined to be the same if the bar widths are within a range provided with a certain margin. For example, the condition such that a bar width a and a bar width b are the same is:

$$1.25a \geq b \geq 0.75a.$$

However, in a case where the barcode is photographed using a low-resolution digital camera, the minimum width of the bars in the image is only about two pixels. In practice, the width of two pixels can be one pixel or three pixels depending on a margin of error in an input process. In this case, the fluctuation of the width is large, resulting in 50% of the actual width. If the width is thick, the width of four pixels can be five pixels or three pixels, in many cases. In this case, the range of fluctuation is 25% with respect to the actual width. This poses problems in that, when comparing the widths of all the bars as mentioned above, if the ranges of all the widths are decided to be the same, determination cannot be made accurately when the fluctuation relative to the bar widths is large, for example.

DISCLOSURE OF THE INVENTION

The problem to be resolved in the present invention is to recognize a barcode in high precision from a barcode image photographed using a low-resolution image sensor. It is thus necessary to extract a barcode field from an inputted image in an improved precision. Also, it is necessary to take the widths of the bars from the input image without specifying the widths of the bars in advance so that the widths can be correctly recognized even if the widths of the bars are fluctuated. By using the low-resolution image sensor, the width of the narrowest bars is about two pixels. However, also in this case, it is necessary to correctly determine and recognize the widths of a plurality of bars without being influenced by noises, for example. Further, it is necessary to support barcodes having a plurality of widths.

The present invention has been made in view of such problems, and it is an object of the present invention to provide a barcode recognition apparatus for recognizing barcodes in an improved precision even in low-resolution images photographed with a small image sensor built in a mobile terminal.

The barcode recognition apparatus of the present invention comprises preprocessing means for preprocessing an input image, binarization process means for binarizing the preprocessed input image, labeling means for labeling the binarized input image, barcode field extracting means for extracting a barcode field from the labeled input image, and barcode recognizing means for recognizing a barcode from the extracted barcode field.

Desirably, in the barcode recognition apparatus of the present invention, the preprocessing means performs a histogram transformation.

Desirably, the binarization process means employs a discriminant analysis method as a method for determining a threshold value in the binarization of an image.

Desirably, in the barcode recognition apparatus of the present invention, the labeling means performs labeling by allocating individual numerical value names to each of patterns that are connected to the input image.

Desirably, the width of a bar is defined in the number of black pixels/the height in the vertical direction regarding the labels of the bar from the input image labeled by the labeling means.

Desirably, when the widths of bars or spaces are collated, an allowable range of the widths is set in accordance with the widths.

Desirably, in the barcode recognition apparatus of the present invention, the barcode field extracting means extracts the adjacency relationship of the bars, and determines the left end and the right end of the bars in accordance with the adjacency relationship. Also, the barcode field is extracted through the correspondence of the number of bars between the left end and the right end of the bars to a certain value that has been prescribed.

Desirably, concerning the adjacency relationship of the bars, bars are determined to be adjacent when all of the conditions that two bars share a scanning line, that the difference of the heights between the two bars is within a certain range, and that the distance between the two bars is within a certain range, are satisfied. Also, the range of the difference of the bar heights and the range of the distance of the bars are obtained in an adaptive manner from the height and width of a bar used as a criterion.

Desirably, in the barcode recognition apparatus of the present invention, barcode recognition employs the minimum width of the bars in the barcode field as a unit width, the barcode field being extracted via the barcode field extracting means. And the barcode recognition is performed by collating the arrangement of the pattern of the widths of bars and spaces in the extracted barcode field with a prescribed arrangement of the pattern of the widths of bars and spaces, the widths being integral multiples of the unit width.

Desirably, the barcode recognition is repeated varying the unit width.

According to the barcode recognition apparatus of the present invention, by using a camera that employs a small image sensor such that it is built in a mobile terminal, a barcode can be recognized in an improved precision from a photographed barcode image. Also, according to the present invention, the barcode can be read without attaching a barcode reader in particular, since the barcode can be recognized even when a low-resolution camera is used.

A mobile phone according to the present invention comprises the barcode recognition apparatus of the present invention. By embedding the barcode recognition apparatus in the mobile phone, barcode recognition can be readily performed anyplace. Further, a barcode recognized via the barcode recognition apparatus can be instantly transmitted.

A barcode recognition method according to the present invention comprises the steps of preprocessing an input image, binarizing the preprocessed input image, labeling the binarized input image, extracting a barcode field from the labeled input image, and recognizing a barcode from the extracted barcode field.

The present invention can also be realized as a program for enabling a computer to function as a barcode recognition apparatus or as a recording medium in which such the program is recorded.

BRIEF DESCRIPTION OF THE DRAWINGS

FIG. 7 shows a diagram to describe an allowable error ratio.

FIG. 8 shows a diagram to describe an arrangement pattern of widths of left guards.

FIG. 9 shows a diagram to describe an arrangement pattern of bars and a space of left guards.

FIG. 10 shows a diagram indicating arrangement patterns of widths relative to numerical values.

FIG. 11 shows a diagram indicating combinations of whether widths 1 to 4 shown in FIG. 10 are bar widths or space widths.

FIG. 13 shows a diagram indicating results of combinations (prefix digits) of odd parity and even parity.

FIG. 14 shows a diagram indicating an arrangement pattern of widths of center bars.

FIG. 15 shows a diagram indicating an arrangement pattern of bars and spaces of center bars.

BEST MODE FOR CARRYING-OUT OF THE INVENTION

In the present invention, after an inputted image is preprocessed using a histogram transformation, the inputted image is subjected to binarization and then to a labeling process. On the basis of the characteristics of the structure of a barcode, the adjacency relationship of bars is calculated from the labeled image. The adjacency relationship is examined regarding all connection fields of the image on the basis of a connection field of a candidate bar that satisfies the following conditions as an adjacent bar, for example.

Figure 21:
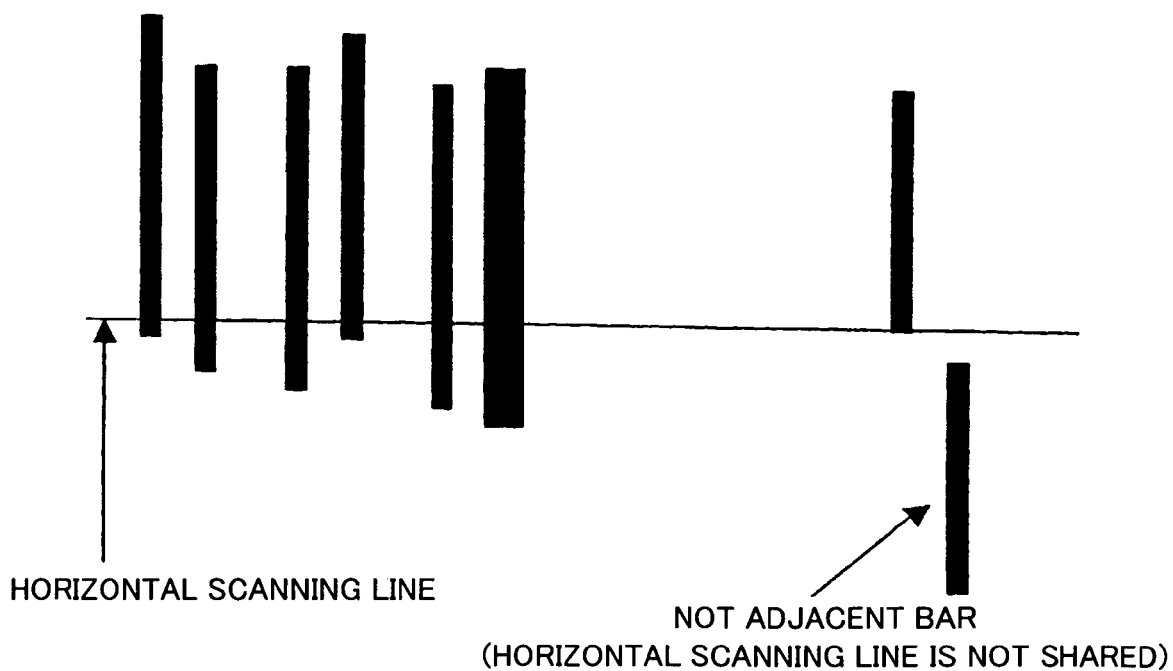
FIG. 21 shows an illustration to describe condition (1) of an adjacent bar.

(1) As shown in FIG. 21, two bars share a horizontal scanning line 9.

Figure 22:
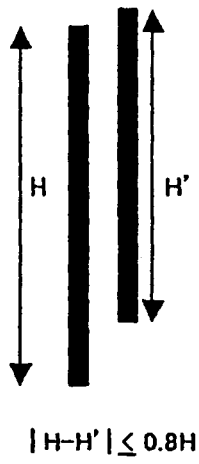
FIG. 22 shows an illustration to describe condition (2) of an adjacent bar.
Figure 22:
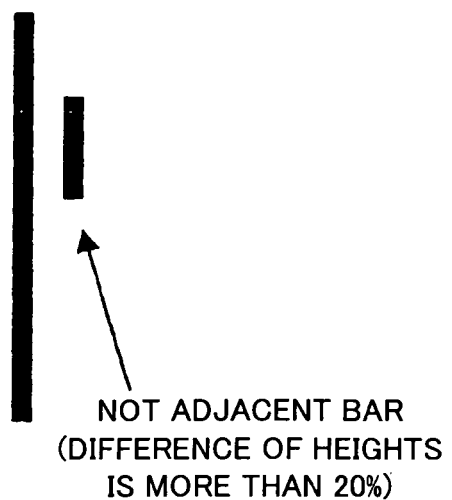

(2) As shown in FIG. 22, the difference of the heights of the neighboring bars is within a certain range. In this case, the range is not more than 20% of the bar height.

Figure 23:
FIG. 23 shows an illustration to describe condition (3) of an adjacent bar.
Figure 23:
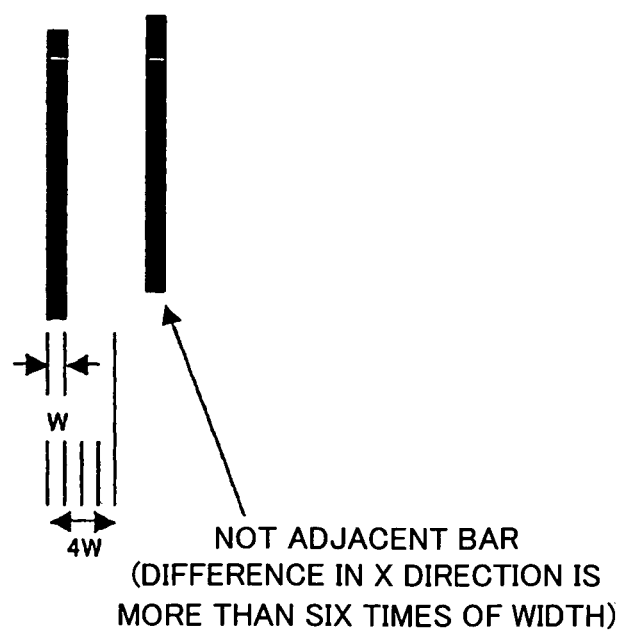

(3) As shown in FIG. 23, the difference of positional coordinates in the X direction is within a certain range. In this case, the range is not more than 6 times of a bar width.

Next, the number of bars held between the left end and the right end is counted. If the count value is equal to a prescribed number, the bars are extracted as a barcode field. A unit width, which is to be used as the module width of the barcode, is determined in accordance with the width of the connection field of black pixels within the extracted barcode field.

Based on the arrangement of patterns of the widths of bars and spaces, which are integral multiples of the unit width, the barcode is recognized by collating a prescribed barcode pattern with the pattern in the extracted barcode field. In the recognition, the pattern of the left guards of the barcode is first collated. If the collation is succeeded, the pattern of the six digits on the left, the prefix digit, the center bars, and the pattern of the six digits on the right are sequentially collated. In the case of the aforementioned pattern collation, the influence of noises in a low-resolution image, for example, is reduced by setting an allowable range in accordance with the widths of the bars and spaces, namely, in each magnification.

According to the present invention, the barcode can be recognized in an improved precision even in low-resolution images photographed using a small image sensor built in a mobile terminal.

In the following, an embodiment of the present invention is described in detail with reference to attached drawings.

Figure 1:
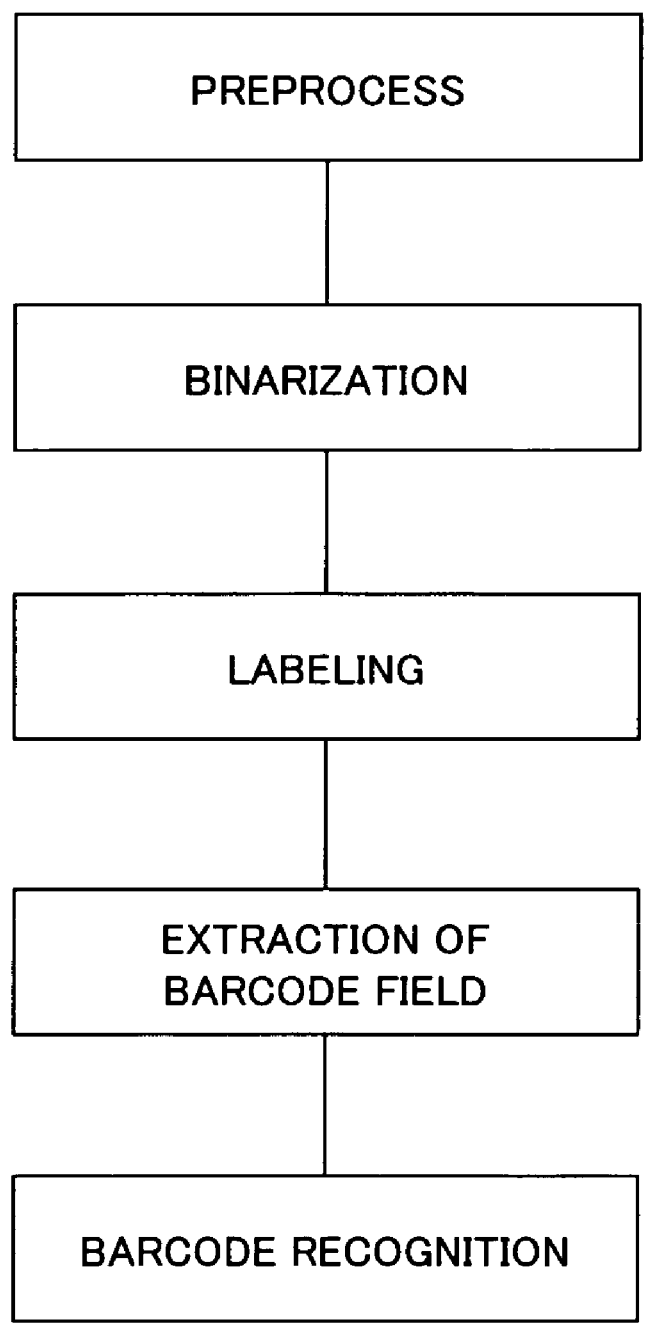
FIG. 1 shows a flowchart indicating a flow of a process of barcode recognition.

FIG. 1 shows a flowchart indicating the flow of the process of barcode recognition.

In FIG. 1, in step 1, an input image is converted into histograms as a preprocessing. When the minimum value of the brightness of the input image is represented by Yi and the maximum value is represented by Yj, brightness Y' after the conversion relative to brightness Y is obtained by the following formula (1).

Formula (1):

$$Y' = \frac{255}{Y_j - Y_i}(Y - Y_i)$$

First, the derivative value of the brightness Y' is calculated. Pixels with derivative values that are not less than a threshold value are handled as edge portions. The histogram of the brightness of the edge portions is prepared.

In step 2, the image processed in step 1 is binarized. The calculation of the derivative value of the brightness is stabilized by the binarization process, thereby improving the contrast of a low-contrast image.

A binarization threshold is determined from the histogram obtained above, and the image is binarized. The determination method of the threshold may employ a determination analysis method, for example. The determination analysis method is performed as follows.

In a case where an image whose brightness ranges from "0 to D" is binarized with a threshold value of t, if an average brightness of pixels whose brightness ranges from "0 to t−1" is $f_0$, an average brightness of pixels whose brightness ranges from "t to D" is $f_1$, an average brightness of the entire image is f, and the number of pixels having a brightness of k is $n_k$, interclass variance $\sigma_B^2$ is represented by the following formula (2) and intraclass variance $\sigma_I^2$ is represented by the following formula (3).

Formula (2):

$$\sigma_B^2(t) = \frac{\sum_{k=0}^{t-1} n_k(f_0 - f)^2 + \sum_{k=t}^{D} n_k(f_1 - f)^2}{\sum_{k=0}^{D} n_k}$$

-continued

Formula (3):

$$\sigma_I^2(t) = \frac{\sum_{k=0}^{t-1} n_k(k-f_0)^2 + \sum_{k=t}^{D} n_k(k-f_1)^2}{\sum_{k=0}^{D} n_k}$$

In this case, as the variance ratio is represented by the following formula (4), t such that it maximizes F(t) is determined to be the threshold value.

Formula (4):

$$F(t) = \frac{\sigma_B^2}{\sigma_I^2}$$

Figure 2:
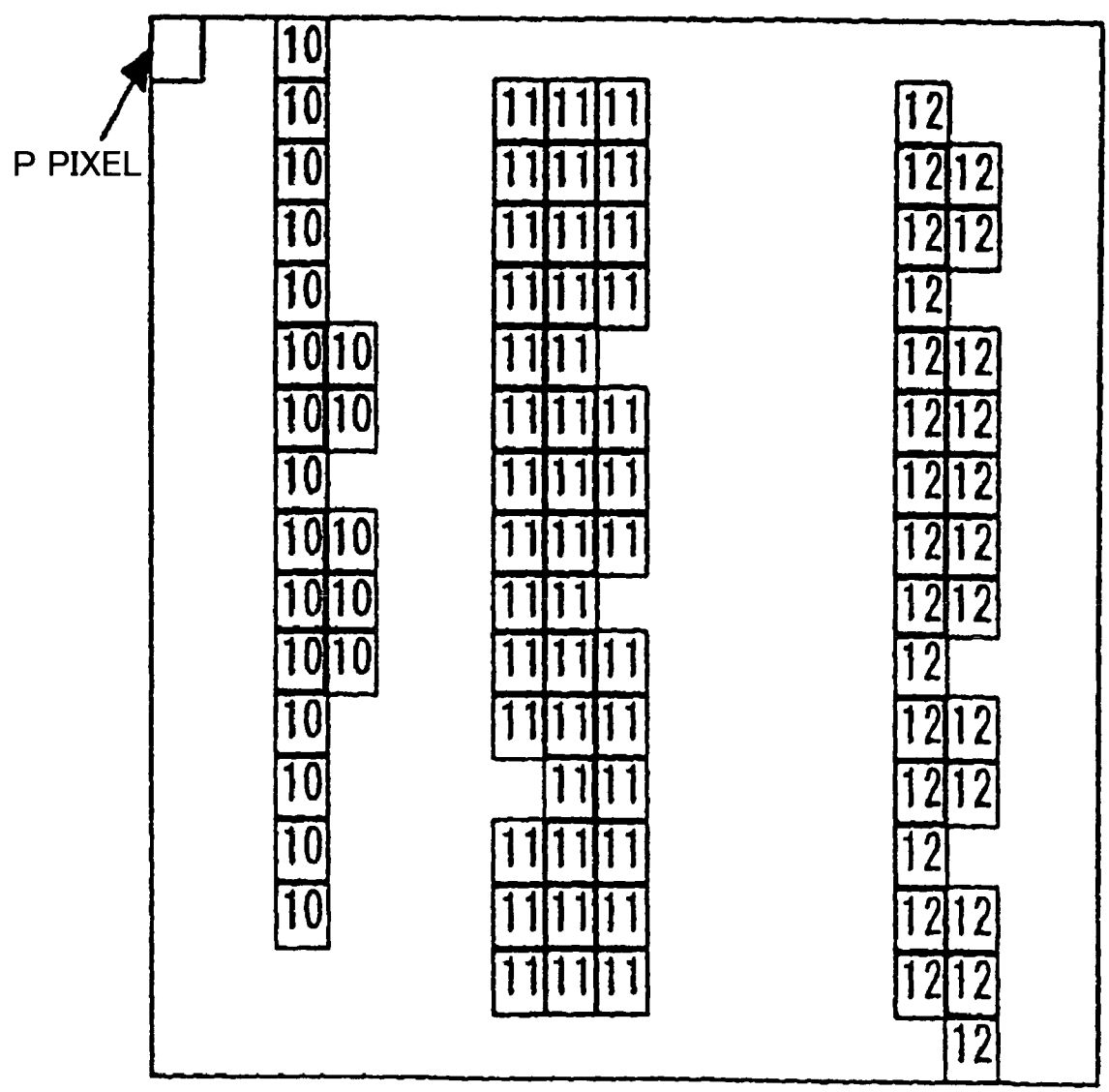
FIG. 2 shows an illustration of an example of a labeling process.

In step 3, a labeling process is performed. The labeling process is, as shown in FIG. 2, performed by attaching a unique label to all black pixels that are connected to the black pixels (having a pixel value of one) of the binarized image. A field consisting of the connected black pixels is referred to as a connection field. As there are various labeling methods, one example is the following method.

(1) An image is scanned from top left to bottom right. A pixel P that has a pixel value of one and that has not been labeled is detected. A new label is attached thereto.

(2) The same label is attached to all pixels that are connected to the pixel P in the image (numerals 10 to 12 in the figure indicate labels).

(3) The process returns to (1). If a pixel that has not been labeled is detected, a new label is attached and process (2) is performed.

(4) When the scanning of the entire image is finished, the process ends.

In step 4, in accordance with pattern information consisting of the height and the width of the connected black pixels based on labeling results, a field in which connection fields of black pixels (bars) are arranged under prescribed conditions is extracted as a barcode field.

In step 5, the arrangement of the widths of the bars and spaces in the extracted barcode field is examined, and a barcode is recognized.

The extraction of the barcode field in step 4 is performed by examining the adjacency relationship between each of the labeled connection fields. In the following, the labeled connection field is referred to as a bar.

Figure 3:
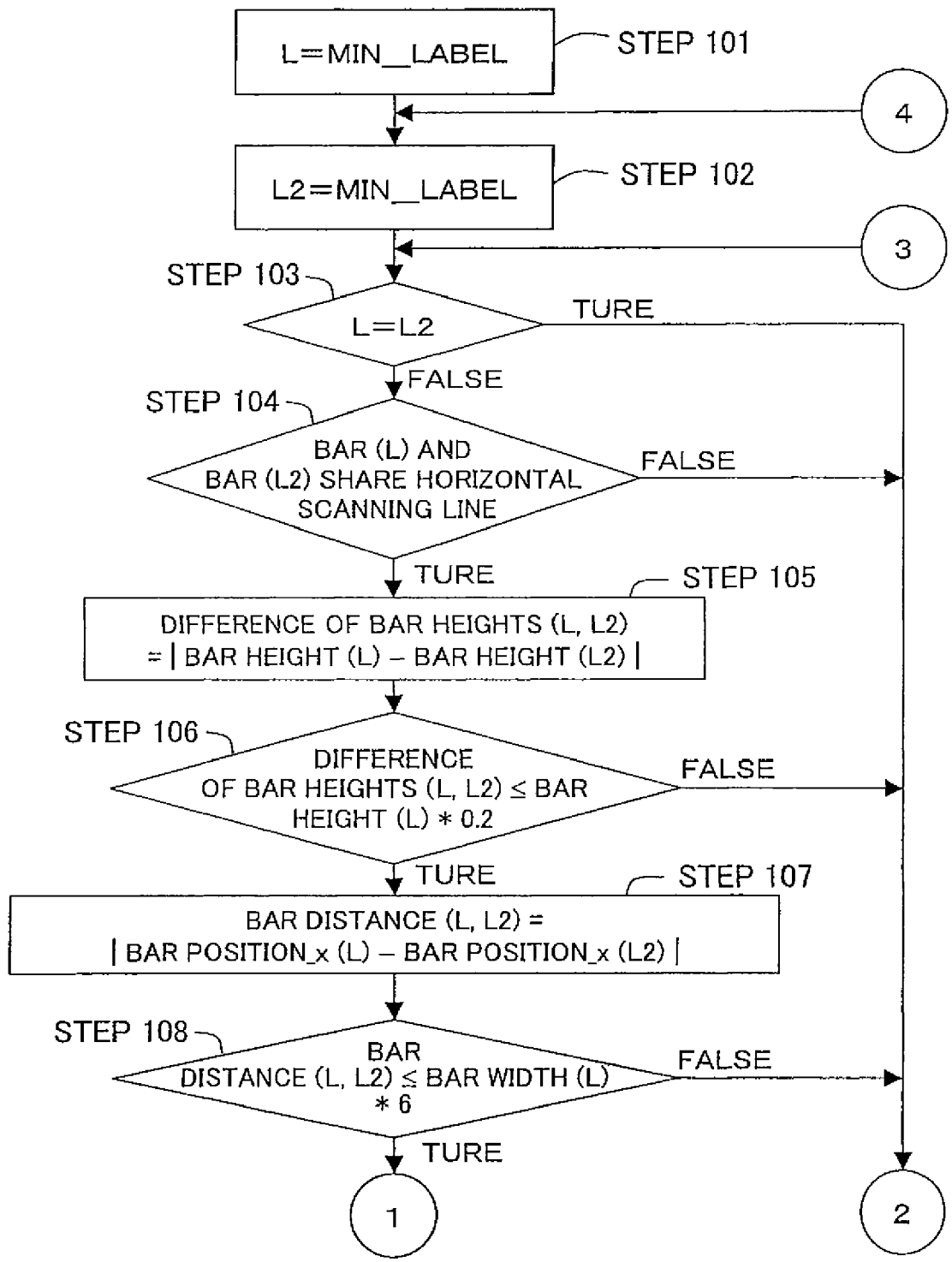
FIG. 3 shows a flowchart (the first half) indicating a flow of a search process for an adjacent bar.
Figure 4:
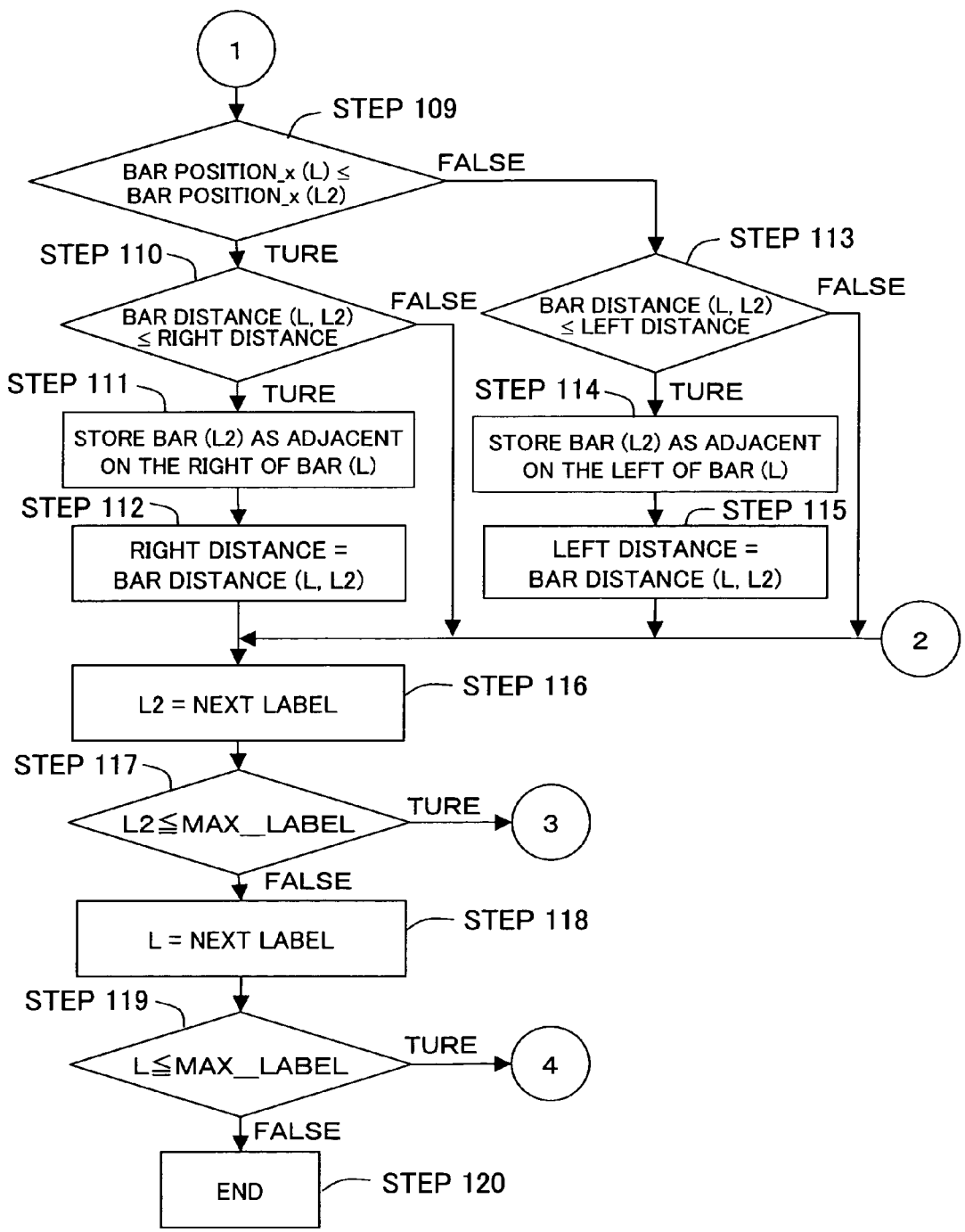
FIG. 4 shows a flowchart (the latter half) indicating a flow of a search process for an adjacent bar.

FIGS. 3 and 4 show flowcharts indicating the flow of a search process for an adjacent bar.

The adjacency relationship is examined using information about the widths, the heights, and the positions of bars. The bar widths and the bar heights are obtained as follows:

the bar height is the height of a rectangle that surrounds the connection field; and the bar width is the area of the connection field/the bar height.

The upper left coordinates of the rectangle that surrounds the connection field are the positional coordinates of the bar.

One example of the conditions of adjacency is determined as follows.

(1) Two bars share a horizontal scanning line.

(2) The difference of the heights of the neighboring bars is not more than 20% of the bar height.

(3) The difference of the positional coordinates in the X direction is not more than 6 times of the bar width.

A bar that satisfies the aforementioned conditions and that has positional coordinates closest to that of the target bar is determined to be an adjacent bar of the bar. There may be adjacent bars on the left and on the right, respectively.

When the adjacency relationships with respect to all the bars are obtained, whether the bars are a barcode field is examined in the following steps.

The flow of the search process for an adjacent bar is described with reference to FIGS. 3 and 4. In FIGS. 3 and 4, the following are defined:

a bar (L) is a connection field (bar) to which a label L is attached;

bar height (L) is the height of a bar (bar height) to which a label L is attached;

bar width (L) is the width of a bar (bar width) to which a label L is attached;

bar position_x (L) is the x coordinate of the positional coordinates of a bar to which a label L is attached;

MAX_LABEL is the maximum value of a label;

MIN_LABEL is the minimum value of a label;

left distance is the minimum value of the horizontal distance of a bar existing on the left of the bar;

right distance is the minimum value of the horizontal distance of a bar existing on the right of the bar;

bar distance (L, L2) is the horizontal distance between a bar to which a label L is attached and a bar to which a label L2 is attached; and bar height difference (L, L2) is the difference of heights between a bar to which a label L is attached and a bar to which a label L2 is attached.

In step 101, first, a label that indicates a focused bar used as a criterion for search is assigned to a variable L. The label increases from the minimum value (LABEL_MIN) of the label to the maximum value (LABEL_MAX) of the label successively.

In step 102, a label that indicates a candidate adjacent bar with respect to the focused bar is assigned to a variable L2. The label increases from the minimum value (LABEL_MIN) of the label to the maximum value (LABEL_MAX) of the label successively.

In step 103, if the variable L and the variable L2 indicate the same value, namely the same bar, the process goes to step 116. If this is not the case, the process goes to step 104.

In step 104, the condition shown in condition (1) above is examined. If condition (1) is satisfied, the process goes to step 105. If the condition is not satisfied, the process goes to step 116.

In step 105, regarding the bar height of the bar to which the label represented by the variable L is attached and the bar height of the bar to which the label represented by the variable L2 is attached, the difference of the bar heights is calculated.

In step 106, the condition shown in condition (2) above is examined. If condition (2) is satisfied, the process goes to step 107. If the condition is not satisfied, the process goes to step 116.

In step 107, regarding the bar position of the bar to which the label represented by the variable L is attached and the bar position of the bar to which the label represented by the variable L2 is attached, the distance in the horizontal direction is calculated.

In step 108, the condition shown in condition (3) above is examined. If condition (2) is satisfied, the process goes to step 109. If the condition is not satisfied, the process goes to step 116. In condition (3), the threshold value is determined on the basis of a relative value with respect to the bar width, so that determination can be correctly performed even if the width of the bar in an input image is not constant.

In step 109, whether the bar to which the label represented by the variable L2 is attached is on the right or on the left of the bar to which the label represented by the variable L is attached is determined on the basis of the positional coordinates of the bars. If the bar is determined to be on the right, the process goes to step 110, and if the bar is determined to be on the left, the process goes to stop 113, respectively.

In step 110, a variable of "right distance" in which the minimum distance to a bar on the right that has been detected thus far is stored is compared with the distance to the current bar on the right. If the distance is closer, the process goes to step 111. If this is not the case, the bar is determined to be non-adjacent on the right and the process goes to step 116.

In step 111, the bar to which the label represented by the variable L2 is attached is determined to be adjacent on the right and the value of the variable L2 is stored. In step 112, the variable of "right distance" is renewed. In step 113, a variable of "left distance" in which the minimum distance to a bar on the left that has been detected thus far is stored is compared with the distance to the current bar on the left. If the distance is closer, the process goes to step 114. If this is not the case, the bar is determined to be non-adjacent on the left and the process goes to step 116.

In step 114, the bar to which the label represented by the variable L2 is attached is determined to be adjacent on the left and the value of the variable L2 is stored. In step 115, the variable of "left distance" is renewed. In step 116, the variable L2 is renewed to be the next lower label.

In step 117, if there is a label that has not been retrieved as a candidate adjacent bar using the variable L2, the process goes to step 103 and the flow of the process is repeated. When search is finished regarding all labels, the process goes to step 118.

In step 118, the variable L is renewed to be a larger label successively. On this occasion, the bar stored as adjacent on the right and the bar stored as adjacent on the left in steps 111 and 114 are decided to be a bar adjacent on the right and a bar adjacent on the left represented by the variable L, respectively.

In step 119, if there is a label that has not been retrieved using the variable L, the process goes to step 102 and the flow of the process is repeated. When search is finished regarding all labels, the process goes to step 120 and the process ends.

When the adjacency relationship is obtained as above, whether the bars are a barcode field is determined in the following procedure.

First, a bar without an adjacent bar on the left is marked as a left end bar. Next, adjacent bars on the right are retrieved successively from the left end bar. A bar without an adjacent bar on the right is marked as a right end bar.

The number of bars from the left end bar to the right end bar is counted. If the number is equal to a prescribed number, the field where the bars from the left end bar to the right end bar and spaces between the bars exist is handled as a barcode field. The prescribed number is determined in accordance with barcode standards. For example, regarding a barcode in JAN 13, the number of bars is 30.

A barcode recognition process is performed on the bars included in an extracted barcode field.

Figure 5:
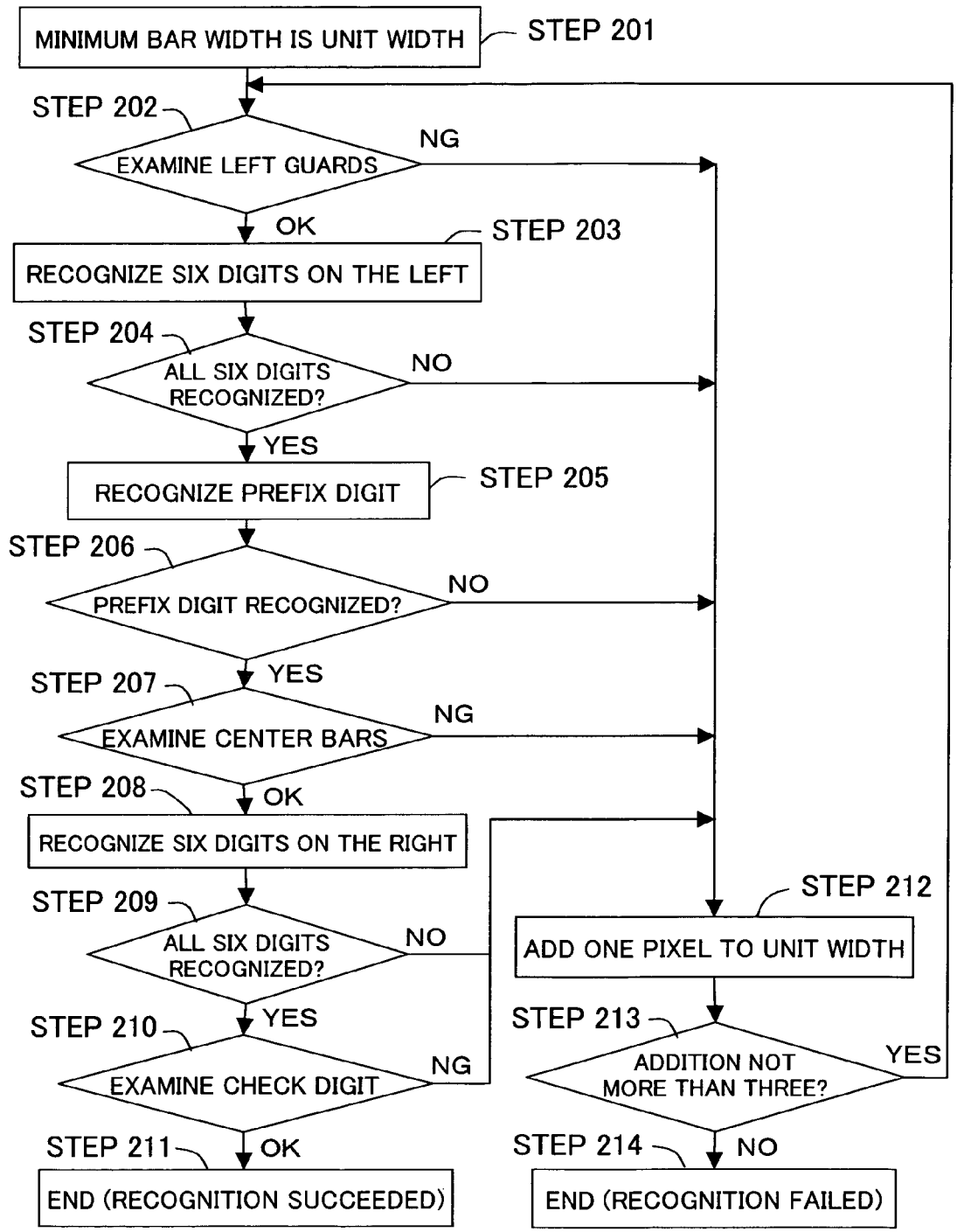
FIG. 5 shows a flowchart indicating a flow of a process of barcode recognition.

FIG. 5 shows a flowchart indicating the flow of the process of barcode recognition.

In step 201, first, a unit width used as a criterion for evaluating the widths of the bars and spaces is determined. Among the bar widths in the barcode field, the minimum width is handled as the unit width. The unit width corresponds to the module width of the barcode.

In step 202, two bars at the left end are collated with the pattern of the left guard bars to examine whether the two bars are the left guards. If the bars are determined to be the left guards, the process goes to step 203. If this is not the case, the process goes to step 212.

In step 203, six-digit numerical values on the left are recognized with respect to the next twelve bars. In step 204, whether the recognition of all the six digits on the left is normally completed is determined. If the recognition is normally completed, the process goes to step 205. If this is not the case, the process goes to step 212.

In step 205, in accordance with the combination of the even parity and odd parity of the six digits on the left, a prefix digit is recognized. In step 206, whether the prefix digit is recognized without contradiction is determined. If the prefix digit is recognized without contradiction, the process goes to step 206. If this is not the case, the process goes to 212.

In step 207, the next two bars are collated with the pattern of the center bars to examine whether the two bars are the center bars. If the bars are determined to be the center bars, the process goes to step 208. If this is not the case, the process goes to step 212.

In step 208, six-digit numerical values on the right are recognized with respect to the next twelve bars. In step 209, whether the recognition of all the six digits on the right is normally completed is determined. If the recognition is normally completed, the process goes to step 210. If this is not the case, the process goes to step 212.

In step 210, a check digit is examined. If the check digit has no contradiction, the process goes to step 211. If this is not the case, the process goes to step 212.

Figure 18:
FIG. 18 shows an illustration of a structure of a barcode.
Figure 19:
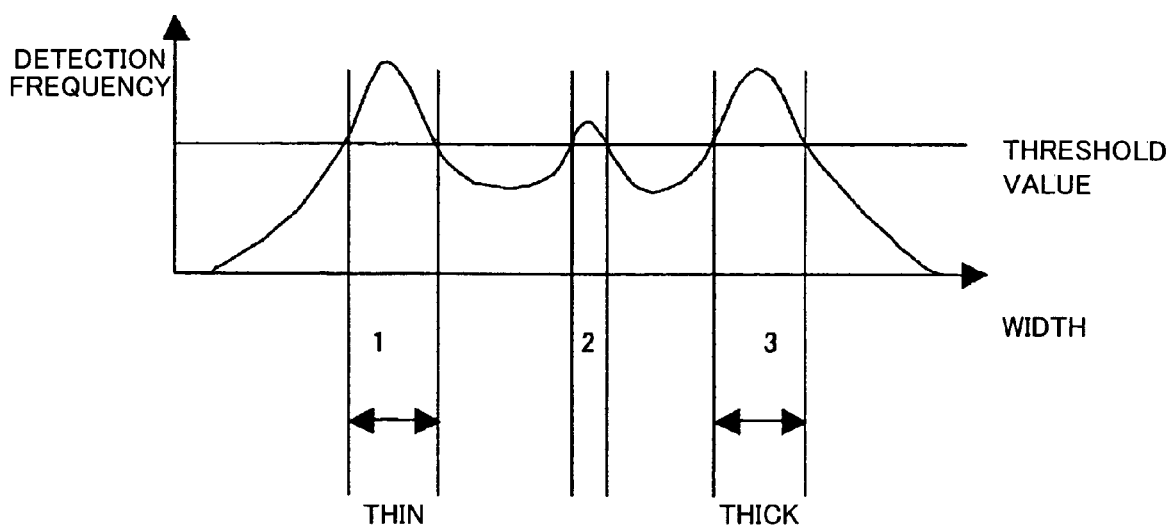
FIG. 19 shows a diagram indicating a relationship between detection frequency and widths.
Figure 20:
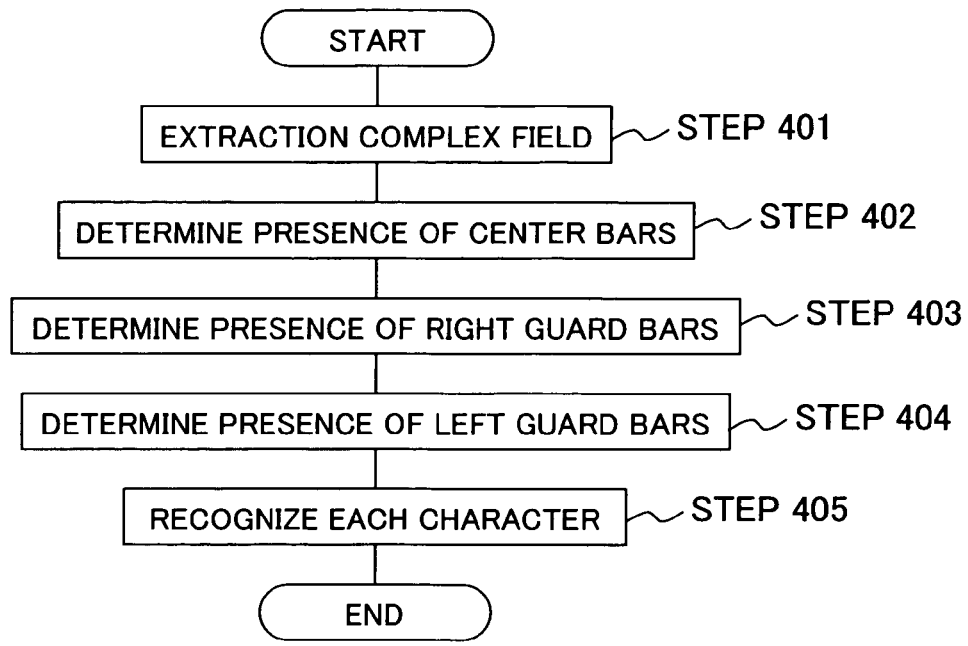
FIG. 20 shows a flowchart indicating a flow of a process of conventional barcode extraction.

The check digit is a numerical value calculated to check the possibility of an error in reading. The last one digit of the six digits on the right is the check digit. The check digit is calculated on the basis of the eleven digits other than the check digit using a prescribed calculation method. A calculation result thereof is collated with the check digit that has been read. If they are equal, they are handled as having no contradiction. In FIG. 18, the check digit is a numerical value of four at the right end.

In step 211, the process ends as the recognition has succeeded. In step 212, one pixel is added to the unit width. In step 213, whether the addition to the unit width is not more than three is determined. If the addition is not more than three, the process goes to 202 and the same recognition process is performed again. If this is not the case, the process goes to 214. In step 214, the process ends as the recognition has failed.

In the aforementioned examination of the left guards, the examination of the centre bars, and the recognition of the numerical values, the widths of bars and spaces are compared with a prescribed pattern and evaluation is performed. The procedure of the evaluation is described in the following.

Figure 6:
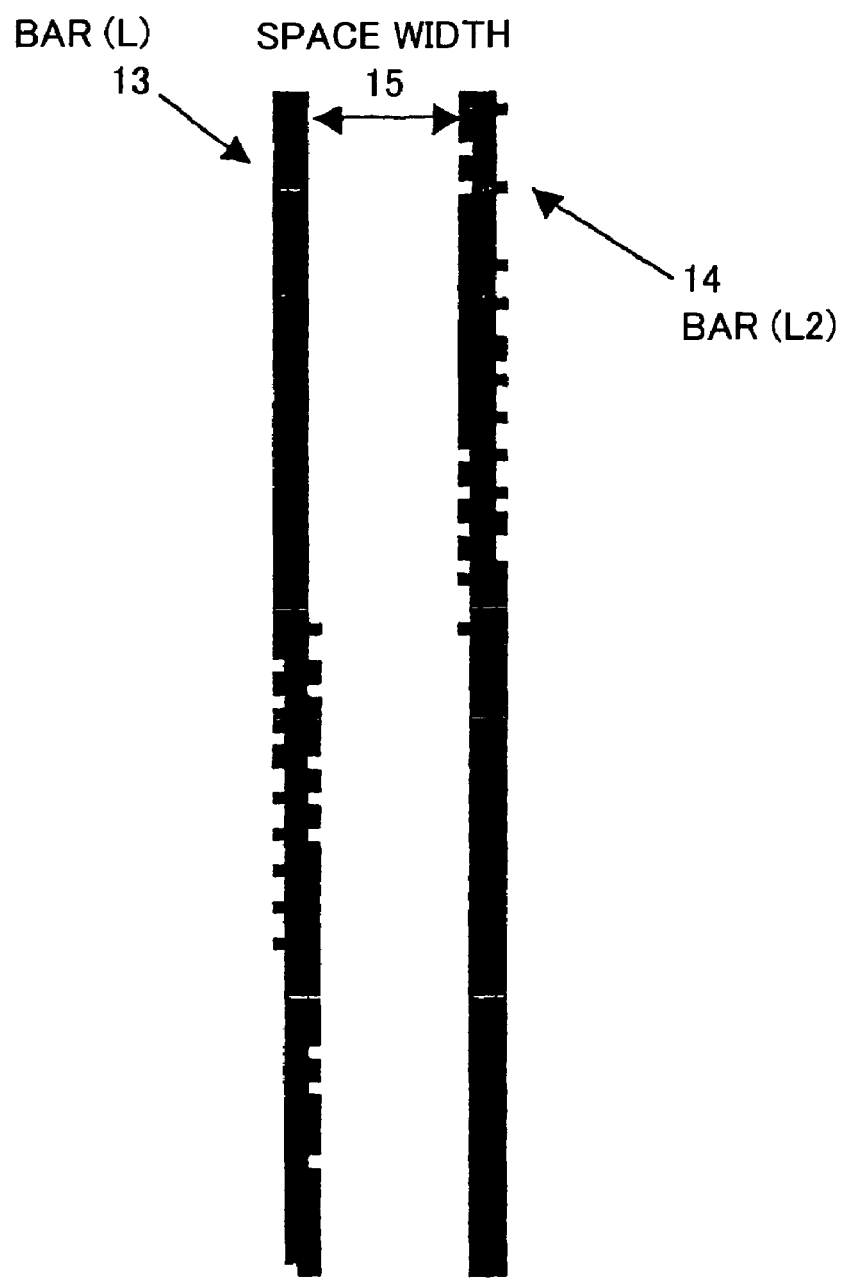
FIG. 6 shows an illustration to describe a space width.

FIG. 6 shows an illustration to describe a space width. FIG. 7 shows a diagram to describe an allowable error ratio.

The widths of the bars and spaces are integral multiples of the unit width and evaluated in each magnification. A space width 15 is, as shown in FIG. 6, a width between two adjacent bars 13 and 14. The space width 15 is obtained as follows.

Regarding the adjacent bars (L) 13 and (L2) 14, the number of pixels between the bars is obtained in each horizontal scanning line. The average of the number of pixels between the bars in all scanning lines that bars (L) 13 and (L2) 14 share is handled as the space width 15.

The pattern of a barcode is prescribed in an arrangement of bars or spaces whose widths are integral multiples of the module width (the unit width) as a criterion. The magnification of the widths is set to one, two, three, and four, respectively. In this case, the narrowest width is one and the widest width is four.

The minimum magnification that satisfies the following condition is the magnification of the bar (space) width. In other words, the condition is that the bar (space) width is within the range of the magnification×the unit width±an allowable error.

In this case, the allowable error is defined with the allowable error=the unit width×an allowable error ratio. The allowable error ratio is prescribed in each magnification as shown in FIG. 7. The allowable error ratio is provided in consideration of the influence of the omission of pixels through binarization. When a barcode is photographed using a low-resolution digital camera, the unit width in an image thereof is only about two pixels. When the binarization is performed, omission of about one pixel and noises of expansion exist in the image of bars. When comparison is performed on the bars that are handled as having a width of two pixels without the allowable error, one-pixel width and three-pixel width are recognized as different widths. However, in practice, two-pixel width may become one-pixel width or three-pixel width due to the noises of binarization. By setting the allowable error, the fluctuation of the width is taken into account and it becomes possible to recognize them as the same width.

The examination of the left guards in step 202 above is performed as follows.

FIG. 8 shows a diagram to describe the arrangement pattern of the widths of the left guards. FIG. 9 shows a diagram to describe the arrangement pattern of the bars and the space of the left guards.

As shown in FIGS. 8 and 9, the arrangement pattern of the bars and the space of the left guards whose widths are obtained on the basis of the evaluation of the widths in the extracted barcode field is collated with a prescribed arrangement pattern of the widths of the bars and the space of the left guards. If the patterns are matched, the bars are handled as valid bars constituting the left guards.

The recognition of numerical values in steps 203 and 208 above is performed as follows.

Figure 12:
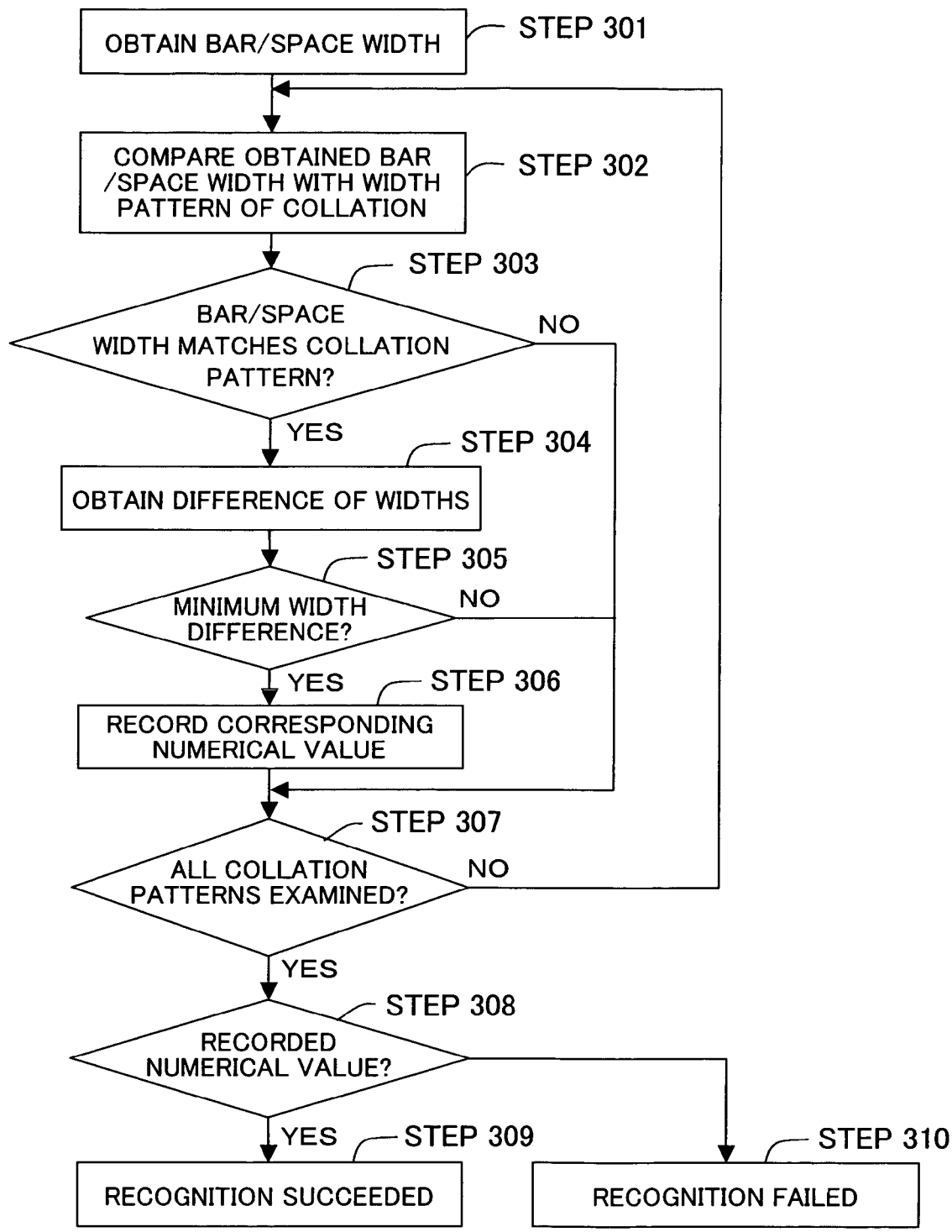
FIG. 12 shows a flowchart indicating a flow of a process regarding numerical value recognition.

FIG. 10 shows a diagram indicating a prescription of arrangement patterns of the widths of bars and spaces with respect to numerical values. FIG. 11 shows a diagram indicating combinations of whether the widths one to four shown in FIG. 10 are bar widths or space widths. FIG. 12 shows a flowchart indicating the flow of a process regarding numerical value recognition.

In FIG. 10, the arrangement patterns of widths with respect to the six digits on the left have odd parity and even parity. The arrangement of widths shown in FIG. 10 is based on odd parity. In the case of even parity, the same table is read from the opposite direction. In other words, the table is read as width four, width three, width two, and width one. For example, in odd parity, a numerical value of nine is represented by an arrangement pattern of a space in triple width, a bar in the unit width, a space in the unit width, and a bar in double width from left. In even parity, a numerical value of one is represented by an arrangement pattern of a space in the unit width, a bar in double width, a space in double width, and a bar in double width from left (see FIG. 18, the first and the second data characters on the left).

In FIG. 11, as the arrangement patterns of the bars and the spaces are different in the six digits on the left and the six digits on the right with respect to the center bars, two types of patterns are defined in FIG. 11. For example, in odd parity, a numerical value of six on the right is represented by an arrangement pattern of a bar in the unit width, a space in the unit width, a bar in the unit width, and a space in quadruple width from left (see FIG. 18, the first data character on the right).

In a flowchart of FIG. 12, in step 301, with respect to the six-digit data characters on the left, an arrangement pattern of the widths of target bars and spaces is obtained in the same procedure as in the examination of the left guards.

In step 302, using the collation patterns prescribed in FIGS. 10 and 11, the aforementioned evaluation of widths is performed to examine successively whether the arrangement pattern of the bars and spaces matches the prescribed patterns. In the six digits on the left, whether the pattern is a width pattern in odd parity or a width pattern in even parity is examined successively.

In step 303, if the patterns are determined to be matched, the process goes to step 304. If this is not the case, the process goes to 307. In step 304, the difference of width between the actual widths obtained from an input image and the prescribed pattern of widths is obtained. The width difference is a total value of each difference in corresponding four widths.

In step 305, if the width difference is smaller than a difference that has been detected thus far, the process goes to step 306. If this is not the case, the process goes to 307.

In step 306, a numerical value that corresponds to the pattern is stored as a numerical value of candidate recognition. At the same time, whether this is an odd parity type or an even parity type is stored. The initial value of the width difference is set to the maximum value.

In step 307, if the process regarding all the collation patterns (numerical values 0 to 9) shown in FIG. 10 is finished, the process goes to step 308. If this is not the case, the process goes to step 302 and the flow of process is repeated for the next collation pattern.

In step 308, if the pattern matches the prescribed numerical value patterns, the numerical value thereof is handled as a recognition result. The process goes to step 309 and the process ends as recognition has succeeded. If this is not the case, the process goes to step 310 and the process ends as recognition has failed.

The recognition of the prefix digit in step 205 is performed as follows.

FIG. 13 shows a diagram indicating the results of combinations (prefix digits) of odd parity and even parity. FIG. 14 shows a diagram indicating an arrangement pattern of the widths of the center bars. FIG. 15 shows a diagram indicating an arrangement pattern of the bars and spaces of the center bars.

In step 205, in accordance with the stored record of odd parity and even parity when the recognition of all the six digits on the left had succeeded, the prefix digit is recognized. The results of combinations of odd parity and even parity are as shown in FIG. 13. The table is searched and a corresponding combination is recognized as the prefix digit. If no corresponding combination is detected, the process ends as the recognition of the prefix digit has failed. In FIG. 18, the six-digit data characters 5 on the left includes nine in odd parity, one in even parity, two in odd parity, three in odd parity, four in even parity, and five in even parity. The combination of parity is 101100, so that the prefix digit 8 is four (shown at the left end of FIG. 18) in accordance with FIG. 13.

The examination of the center bars in step 207 is performed through pattern matching in the same manner as in the examination of the left guards. The patterns of the widths of bars and spaces used for the examination of the center bars are as shown in FIGS. 14 and 15.

The present invention is not limited to the aforementioned embodiment and it is possible to modify such that the present invention is carried out in various manners.

Also, it is possible to embed the barcode recognition apparatus of the present invention in a mobile phone. By embedding the barcode recognition apparatus in the mobile phone, barcode recognition can be readily performed anyplace. Further, a barcode recognized via the barcode recognition apparatus can be instantly transmitted.

Figure 16:
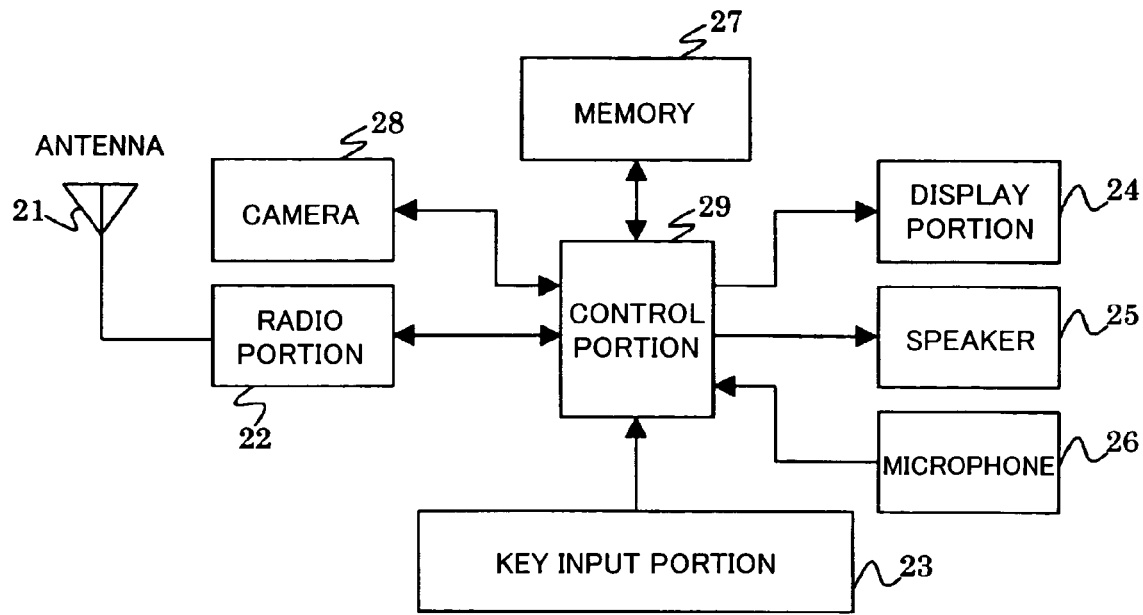
FIG. 16 shows an illustration of a structure of a mobile phone with a built-in camera.

FIG. 16 shows a block diagram in a case where the barcode recognition apparatus of the present invention is embedded in a mobile phone with a built-in camera. The mobile phone with a built-in camera comprises an antenna 21 for transmitting and receiving radio waves, a radio portion 22 for controlling the transmission and reception of radio communication, a key input portion 23 for inputting key operation information from a user to be generated, and a display portion 24 for displaying character information and image information to the user. The mobile phone with a built-in camera further comprises a speaker 25 for outputting a voice signal, a microphone 26 for inputting the voice signal from the user, a memory 27 for storing the inputted character information, image information, and voice signal, a camera 28 for inputting target image information, and a control portion 29 in which the barcode recognition apparatus is built, the control portion 29 controlling each portion.

In the mobile phone with a built-in camera comprising the aforementioned constitution, when a barcode is recognized from image information (a barcode) inputted from the camera 28, the user operates the key input portion 23 and selects camera operations. The control portion 29 initializes the camera 28 on the basis of the setting from the key input portion, and initiates the capturing of the image information (the barcode). The image information (the barcode) captured using the camera 28 is transferred to the memory 27 via the control portion 29. The control portion 29 transfers the image information (the barcode) stored in the memory 27 to the display portion 24 and displays the image information (the barcode). Also, by successively capturing and displaying image information (the barcode), the user can confirm camera images as a motion picture. Meanwhile, the image information (the barcode) stored in the memory 27 is transferred to the control portion 29 provided with the barcode recognition apparatus, and then barcode recognition is performed through the barcode recognition process described in the embodiment. If the recognition has succeeded, the recognition result is transferred to the memory 27 and stored in the memory 27 as barcode data.

Figure 17:
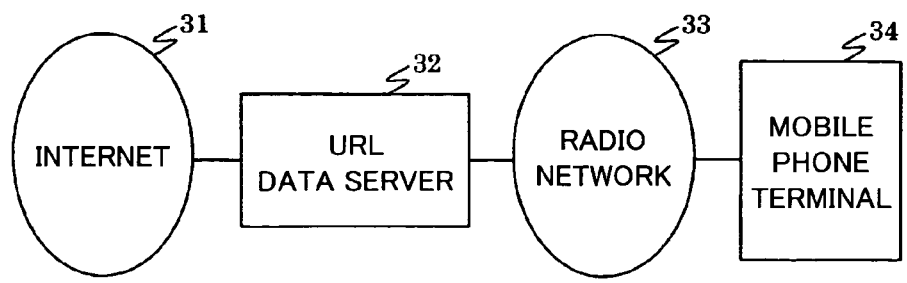
FIG. 17 shows a diagram indicating how a mobile phone terminal is connected to the Internet.

In the following, an operation when the barcode data stored in the memory 27 is transmitted to a destination via the connection to radio or the Internet is described with reference to FIG. 17. The user operates the key input portion 23 and selects the connection to radio or the Internet. The control portion 29 directs the radio portion 22 to connect to radio or the Internet on the basis of the setting from the key input portion. The radio portion 22 initiates the connection to radio or the Internet based on the direction from the control portion 29. The user operates the key input portion 23 and selects the transmission of the barcode data that has been stored in the memory 27. The control portion 29 transfers the barcode data that has been stored in the memory 27 to the radio portion 22 on the basis of the setting from the key input portion 23 and directs transmission. The radio portion 22 transmits the transferred barcode data to radio or the Internet on the basis of the direction from the control portion 29. The barcode data transmitted from the radio portion 22 is transmitted to a URL data server 32 via a radio network 33. The URL data server 32 controls the operations of the radio network 33 of the mobile phone terminal 34 and the gateway of the Internet 31. The URL data server 32 searches for the URL of the destination of the transmission using the received barcode data and a URL database, performs the connection to the Internet 31, and transfers the barcode data to the destination of the transmission. The result of the completion of the transference is transmitted to the mobile phone terminal 34.

The present invention can also be realized as a program for enabling a computer to function as a barcode recognition apparatus or as a recording medium in which the program is recorded.

The electronic mail communication apparatus of the present invention can also be realized by a program to function the present electronic mail communication apparatus. The program may be stored in a recording medium readable via computers.

Regarding the recording medium, a ROM per se having the barcode recognition apparatus built therein may be a program media. Also, the barcode recognition apparatus may be a program media, such as a CD-ROM, which is readable by connecting to a program reading apparatus such as a CD-ROM drive and by inserting a recording media. In both cases, the stored program may be accessed and performed via a CPU, or the program may be read and the read program may be downloaded to a program storage area, which is not shown in the drawings, and then performed. A program for the downloading is stored in the apparatus body in advance.

The aforementioned program media is a recording media that is comprised in the body in a separable manner. The program media may be a medium for statically carrying the program, including tapes such as magnetic tapes and cassette tapes, magnetic disks such as floppy disks and hard disks, optical disks such as CD-ROMs, MOs MDs, and DVDs, cards such as IC cards (including memory cards) and optical cards, and semiconductor memories such as mask ROMs, EPROMs, EEPROMs, and flash ROMs.

Further, the program media may be a medium for dynamically carrying the program such that the program is downloaded from a communication network via the transmission portion and the reception portion of a mobile phone provided with the barcode recognition apparatus. In the case where the program is downloaded from the communication network in this manner, a program for the downloading may be stored in the apparatus body in advance or may be installed from other recording medium. The contents stored in the recording media are not limited to the program and the contents may be data.

INDUSTRIAL APPLICABILITY

As described above, according to the present invention, by using a camera that employs a small image sensor such that it is built in a mobile terminal, a barcode can be recognized in an improved precision from a photographed barcode image. Also, according to the present invention, it becomes possible to read the barcode without attaching a barcode reader in particular, since the barcode can be read even when a low-resolution camera is used.

The invention claimed is:

1. A barcode recognition apparatus comprising:
preprocessing means for determining an edge portion of an input image and transforming the edge portion into a histogram of brightness;

binarization process means for binarizing the preprocessed input image;

labeling means for labeling the binarized input image;

barcode field extracting means for extracting a barcode field from the labeled input image; and barcode recognizing means for recognizing a barcode from the extracted barcode field.

2. The barcode recognition apparatus according to claim 1, wherein the binarization process means determines a threshold value in the binarization of the image on the basis of the input image transformed into the histogram.

3. The barcode recognition apparatus according to claim 1, wherein the binarization process means employs a discriminant analysis method as a method for determining a threshold value in the binarization of an image.

4. The barcode recognition apparatus according to claim 1, wherein the labeling means performs labeling by allocating individual numerical value names to each of patterns that are connected to the input image.

5. The barcode recognition apparatus according to claim 4, wherein the width of a bar is defined in the number of black pixels/the height in the vertical direction regarding the labels of the bar from the input image labeled by the labeling means.

6. A barcode recognition apparatus comprising:

preprocessing means for determining an edge portion of an input image photographed via a camera and transforming the edge portion into a histogram of brightness;

binarization process means for binarizing the preprocessed input image;

labeling means for labeling the binarized input image;

barcode field extracting means for extracting a barcode field from the labeled input image; and barcode recognizing means for recognizing a barcode from the extracted barcode field, wherein as a condition of an adjacency of bars in the barcode, a relative value with respect to the widths of the bars is determined to be a threshold value.

7. The barcode recognition apparatus according to claim 6, wherein when the widths of the bars or spaces are collated, an allowable range is set in accordance with the widths.

8. The barcode recognition apparatus according to claim 6 wherein the barcode field extracting means extracts the adjacency relationship of the bars, determines a left end and a right end of the bars in accordance with the adjacency relationship, and extracts a barcode field through the correspondence of the number of bars between the left end and the fight end of the bars to a certain value that has been prescribed.

9. The barcode recognition apparatus according to claim 8, wherein the adjacency relationship of the bars is determined to be adjacent when all of the conditions that two bars share a scanning line, that the difference of the heights between the two bars is within a certain range, and that the distance between the two bars is within a certain range, are satisfied, and wherein, the range of the difference of the bar heights and the range of the distance of the bars are obtained on the basis of relative values with respect to the height and the width of a bar used as a criterion.

10. The barcode recognition apparatus according to claim 8, wherein barcode recognition employs the minimum width of the bars in the barcode filed as a unit width, the barcode field being extracted via the barcode field extracting means, and wherein the barcode recognition is performed by collating the arrangement of the pattern of the widths of bars and spaces in the extracted barcode field, the widths being integral multiples of the unit width, with a prescribed arrangement of the pattern of the widths of bars and spaces.

11. The barcode recognition apparatus according to claim 10, wherein the barcode recognition is repeated varying the unit width.

* * * * *